US006629506B2

(12) United States Patent
Park

(10) Patent No.: US 6,629,506 B2
(45) Date of Patent: Oct. 7, 2003

(54) LEG STRUCTURE OF DESK

(76) Inventor: Hyuk Koo Park, 801-801 Beoksan Hansung Apt., 1267 Kwonsun-dong, Kwonsun-gu, Suwon-shi, Kyonggi-do (KR)

(*) Notice: Subject to any disclaimer, the term of this patent is extended or adjusted under 35 U.S.C. 154(b) by 0 days.

(21) Appl. No.: 09/968,039

(22) Filed: Oct. 2, 2001

(65) Prior Publication Data

US 2002/0092448 A1 Jul. 18, 2002

(30) Foreign Application Priority Data

Jan. 16, 2001 (KR) ........................................ 2001-2433

(51) Int. Cl.[7] ................................................ A47B 47/00

(52) U.S. Cl. ......................... 108/156; 403/13; 403/200; 403/305; 248/188

(58) Field of Search ........................... 108/156, 157.16, 108/158, 158.11, 158.12, 159; 248/188, 188.4, 188.8; 403/13, 14, 187, 188, 192, 200, 300, 301, 305, 306, 307

(56) References Cited

U.S. PATENT DOCUMENTS

| | | | | | |
|---|---|---|---|---|---|
| 713,334 | A | * | 11/1902 | Niehaus | 403/22 |
| 1,539,112 | A | | 5/1925 | Gloekler | |
| 2,730,419 | A | * | 1/1956 | Watrous et al. | 108/156 |
| 2,762,670 | A | | 9/1956 | Cantwell | |
| 2,859,804 | A | * | 11/1958 | Healy | 248/188.8 |
| 2,868,602 | A | * | 1/1959 | Drezner | 403/298 |
| 2,904,379 | A | * | 9/1959 | Nelson | 403/297 |
| 3,175,794 | A | * | 3/1965 | Beene, III | 248/188 |
| 4,067,656 | A | * | 1/1978 | Dennis | 403/296 |
| 4,549,711 | A | * | 10/1985 | Giltnane | 248/188 |
| 4,919,561 | A | * | 4/1990 | Kee | 403/305 |
| 5,688,287 | A | * | 11/1997 | Cline | 5/310 |

FOREIGN PATENT DOCUMENTS

| | | | | | |
|---|---|---|---|---|---|
| AU | 245923 | | * | 3/1964 | 108/156 |
| DE | 33 22 743 | A | | 1/1985 | |
| DE | 297 04 418 | U | | 4/1997 | |
| EP | 0 862 875 | A | | 9/1998 | |
| FR | 697 081 | A | | 1/1931 | |
| FR | 1239236 | | * | 7/1960 | 108/156 |

* cited by examiner

*Primary Examiner*—Janet M. Wilkens
(74) *Attorney, Agent, or Firm*—McDermott, Will & Emery

(57) ABSTRACT

A leg structure of a desk constructed to provide a stronger durability at places such as kindergarten, children's house and the like and to conform to body shape of a user such as child, thereby facilitating to easily adjust height of an upper plate, which comprises a plurality of leg members; a male screw part screwed to one end of the leg members with a bolt part externally protruded at the center thereof; a female screw part screwed to the other end of the leg members with a nut part at the center thereof to be coupled with the bolt part of the male screw part, so that a plurality of leg members with the male and female screw parts coupled at both sides thereof are sequentially connected to form a leg of a desk; a coupling unit having a bottom side coupled with an upper end of the leg, a flange part formed at an upper side to be coupled to an upper plate with a plurality of screws and a fitting protruder formed at the top center of the flange part; and a fitting groove formed at the bottom surface of an upper plate for insertion of the fitting proturder.

9 Claims, 6 Drawing Sheets

LEG STRUCTURE OF DESK

BACKGROUND OF THE INVENTION

1. Field of the Invention

The present invention relates to a leg structure of a desk, and more particularly to a leg structure of a desk constructed to provide a stronger durability at places such as kindergarten, children's house and the like and to conform to body shape of a user such as child, thereby facilitating to easily adjust height of an upper plate.

2. Brief Description of the Related Art

Places such as kindergarten, children's house and the like need frequent moving and rearrangement of desks for application of various educational methods, which inevitably applies repeated impact or shock to legs of desk, leading to easy breakdown of the desks. Facilities such as above therefore spend lots of money particularly on maintaining and repairing of desks.

In addition, the desks used at the facilities described above frequently need adjusting the height thereof according to fast growing body conditions of major users, children. Up to now, almost no desks have been available for controlling the height thereof for such a purpose.

As conventionally used leg structure of a desk is shown in FIG. 7, a leg 102 is coupled with a coupling unit 104 at a lower portion of an upper plate 100. At this time, the leg 102 is generally made in a rod shape, whose height does not allow any adjustment. The coupling unit 104 has an integrated structure including: a female screw part 106 to which the top end of the leg 102 is screwed; and a flange part 110 tightly attached at the lower surface of the upper plate 100 and coupled with a screw 108.

As described above, the conventional desk has the upper plate 100 supported with legs each of which uses the flange part 110 of the coupling unit coupled with a plurality of screws 108. When weight is loaded to the lateral direction of the legs that are longitudinally stretched under the upper plate 100, there will be a momentum caused by the loaded weight to the flange part 110. Therefore, the leg 102 may be easily displaced out of the upper plate due to breakdown of the structure coupled with screws.

On the other hand, if the coupling unit 104 is made of a soft synthetic resin, frequent impacts applied to the leg 102 may generate movements between the screws 108 and the flange part 110 of the coupling unit, thereby easily deteriorating the fixing force of the screws 108.

Furthermore, it has been taken for granted that it is difficult to adjust the height of a desk with a generally rod shaped leg 102 as described above. Therefore, there is a problem in the desk having a fixed height in that children feel uncomfortable and grow to have wrong posture by using the desk.

SUMMARY OF THE INVENTION

It is an object of the present invention to solve the aforementioned problem and provide a leg structure of a desk constructed to further reinforce the coupling force between an upper plate and legs of a desk, thereby improving durability without easy breakdown of the leg coupling structure and allowing more frequent adjustments in height of a desk.

In order to accomplish the aforementioned object of the present invention, there is provided a leg structure of a desk comprising:

a leg:

a coupling unit with its bottom side being coupled with the upper end of the leg, having a flange part to be coupled to an upper plate with a plurality of screws and a fitting protruder formed at the top center of the flange part;

a fitting groove formed at the bottom surface of an upper plate for insertion of the fitting protruder.

Also, the leg structure of a desk of the present invention comprises:

a plurality of leg members;

a male screw part screwed to one end of the leg members with a bolt part externally protruded at the center thereof; and a female screw part screwed to the other end of the leg members with a nut part at the center thereof for to be coupled with the bolt part of the male screw part, so that a plurality of leg members with the male and female screw parts coupled at both sides thereof are sequentially connected to form a leg of a desk.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
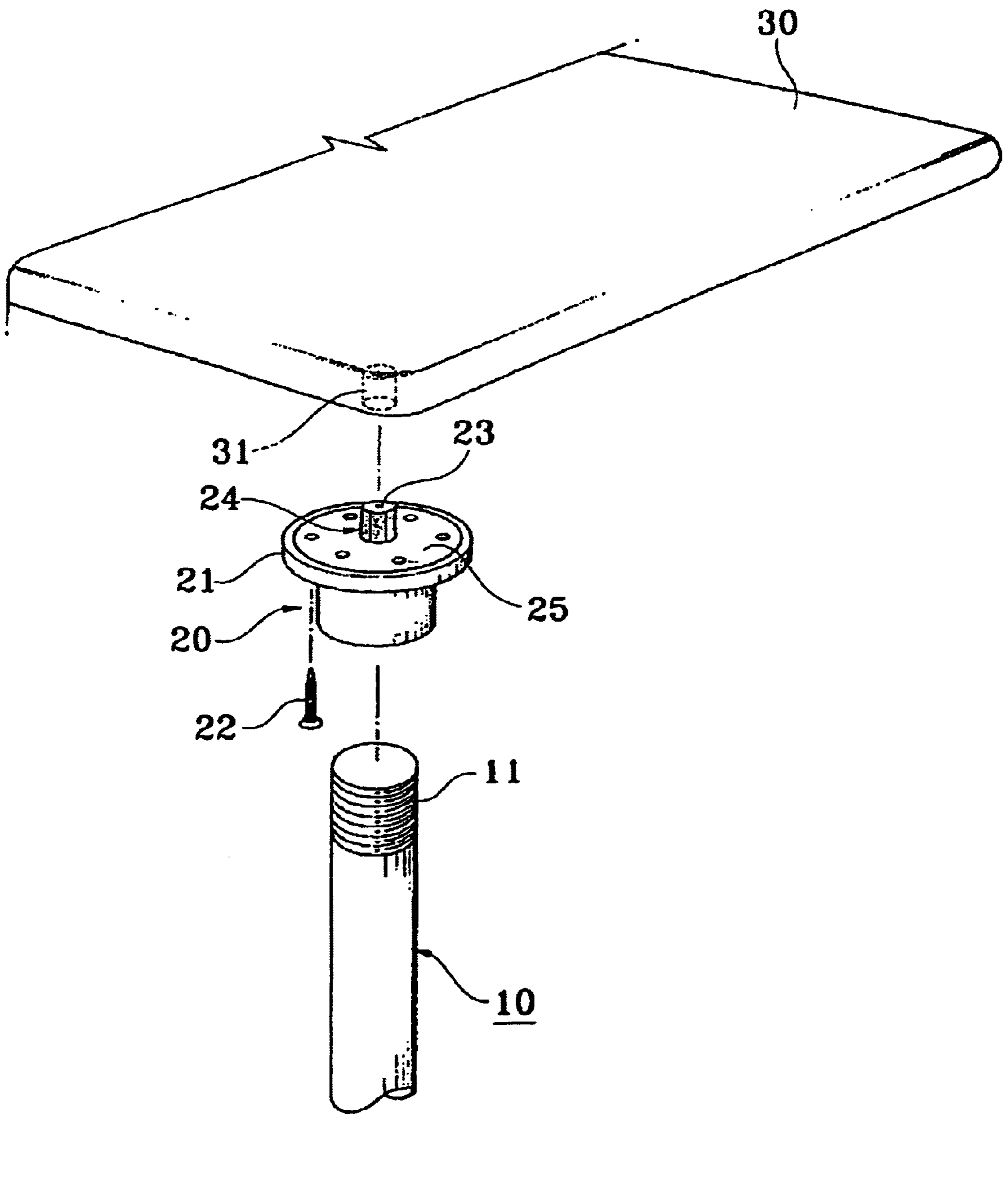
FIG. 1 is an analyzed, perspective view for illustrating the coupling structure between an upper plate and a leg coupling part for a leg of a desk.
Figure 2:
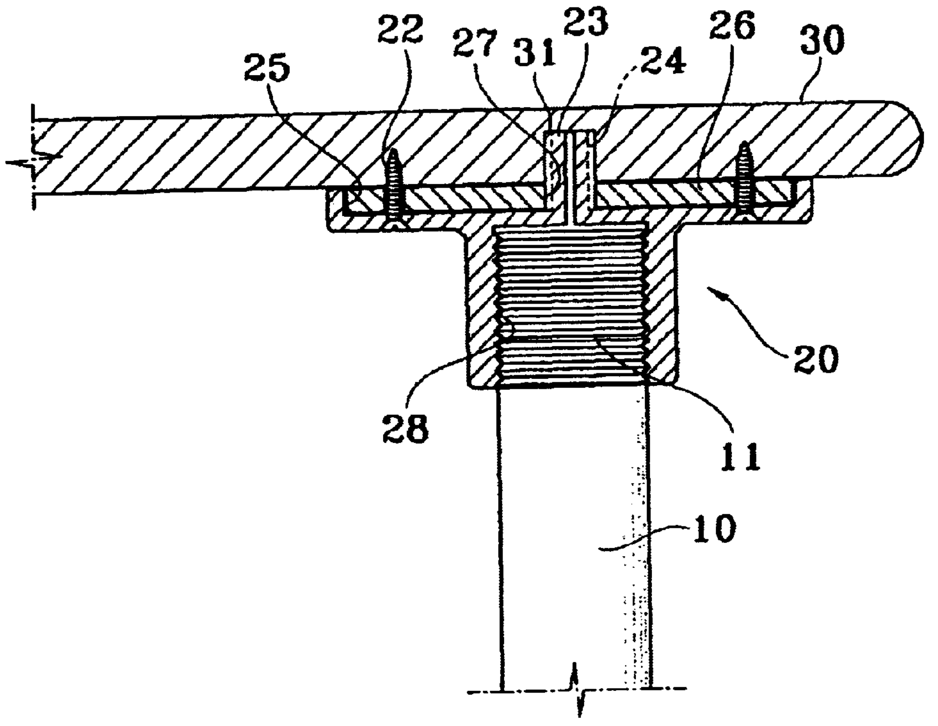
FIG. 2 is a cross-sectional view for illustrating the coupled state of the structure shown in FIG. 1.

FIGS. 1 and 2 illustrate a top part of a leg structure of a desk in accordance with the present invention including a leg 10, a coupling unit 20 having a flange part 21, and a upper plate 30 to which the coupling unit 20 is to be attached.

At this time, the coupling unit 20 includes a female screw 28 at the bottom portion thereof to be coupled with a male screw 11 formed at the upper end of the leg 10, a flange part 21 at the top portion thereof to be coupled with the upper plate 30 by a plurality of screws 22, and a fitting protruder 23 formed at the top center portion of the flange part 21.

Therefore, the fitting groove 31 is formed for insertion of the fitting protruder 23 into the upper plate 30.

At this time, a plurality of teeth 24 are formed at the external circumferential surface for insertion into the fitting groove 32 of the upper plate by forcible fitting, so that the coupling unit 20 and the upper plate 30 are more firmly coupled with slight elasticity offered by the edge part of the teeth 24.

Figure 3:
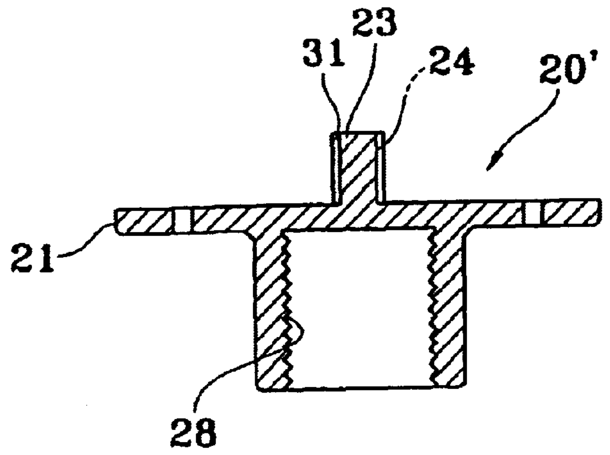
FIG. 3 is a cross-sectional view for illustrating a connection unit used for another embodiment of the present invention.

On the other hand, in the embodiment of the present invention, a predetermined depth of a groove 25 is formed at the upper portion of the flange part 21 of the coupling unit for insertion of a hard reinforcing member 26, thereby achieving a more tightly screwed state, without any movement, between the screw 22 and the flange part 21 of the coupling unit 20. At this time, a coupling unit 20' can also be formed in an integrated type, as shown in FIG. 3, without using any aforementioned reinforcing material for the coupling unit 20.

Besides, a fitting groove 27 is formed at the center of the reinforcing material 26 for insertion of the fitting protruder 23, thereby enabling the reinforcing member 26 to be tightly coupled to the groove 25 without application of any bonding agent.

Figure 4:
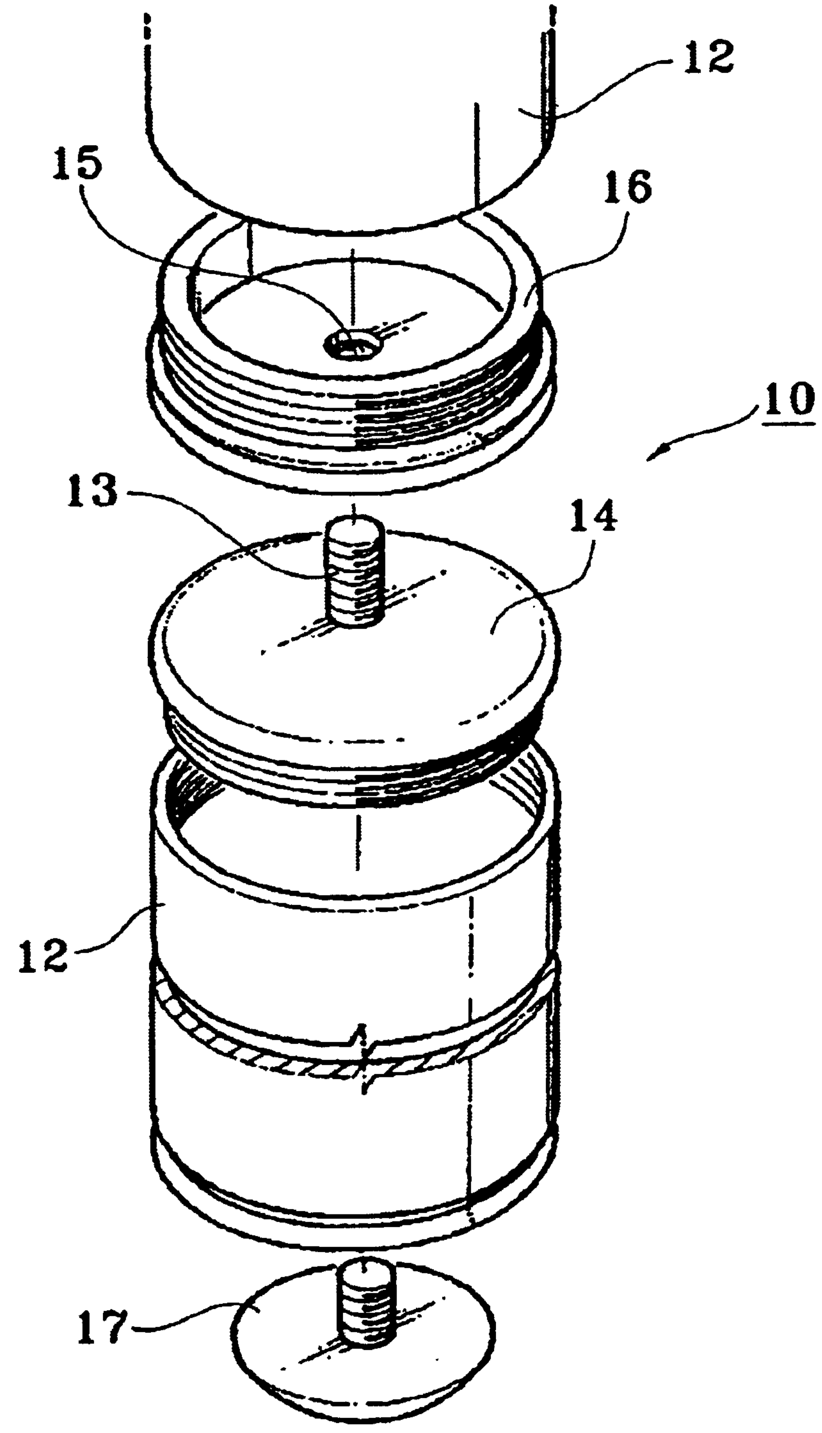
FIG. 4 is an analyzed, perspective view for illustrating the length adjusting structure of a leg of a desk in accordance with the present invention.

As described above, the leg 10 to be coupled to the upper plate 30 is constructed in the structure that a plurality of leg members 12 are interconnected, as shown in FIG. 4, for easy adjustment in length.

At this time, a plurality of leg members 12 are interconnected in the following mechanism comprising a male screw part 14 having a bolt part 13 externally protruded at the center to be screwed to one end of the leg member 12, and a female screw part 16 coupled to the other end of the leg member 12 and formed at the center thereof with a nut part 15 for coupling with the bolt part 13 of the male screw part, so that a plurality of leg members 12 with the male and female screw parts 14, 16 at both ends thereof are sequentially connected to form legs of a desk.

The male and female screw parts 14, 16 can be integrally made into a single part. However, in the preferred embodiment of the present invention, in order to make a significant improvement in the coupling strength between the male and female screw parts 14, 16, the bolt part 13 of the male screw part 14 is made in the structure that a bolt is inserted into the body of the synthetic resin type male screw part 14, and the nut part 15 of the female screw part 16 is made in the structure that a nut is inserted into the body of the synthetic resin type female screw part 16.

Figure 5:
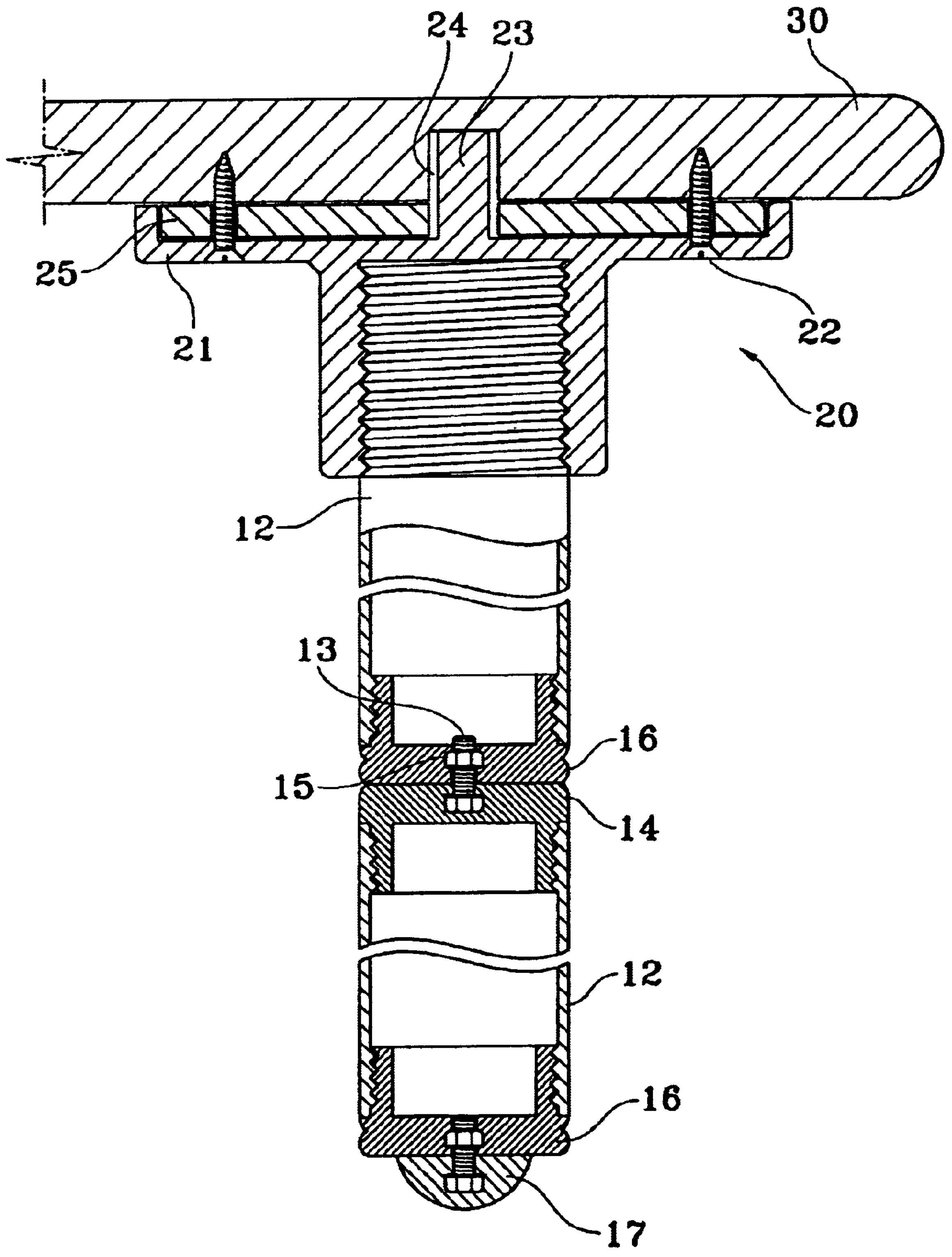
FIG. 5 is a cross-sectional view for illustrating the coupling structure of a leg of a desk in accordance with the present invention.

Furthermore, while the female screw part 16 is coupled at the lower portion of the leg member 12, a support plate 17 having a bolt part is coupled to complete the leg structure of a desk. The whole shape of the leg structure of a desk described above is illustrated in FIG. 5.

Figure 6:
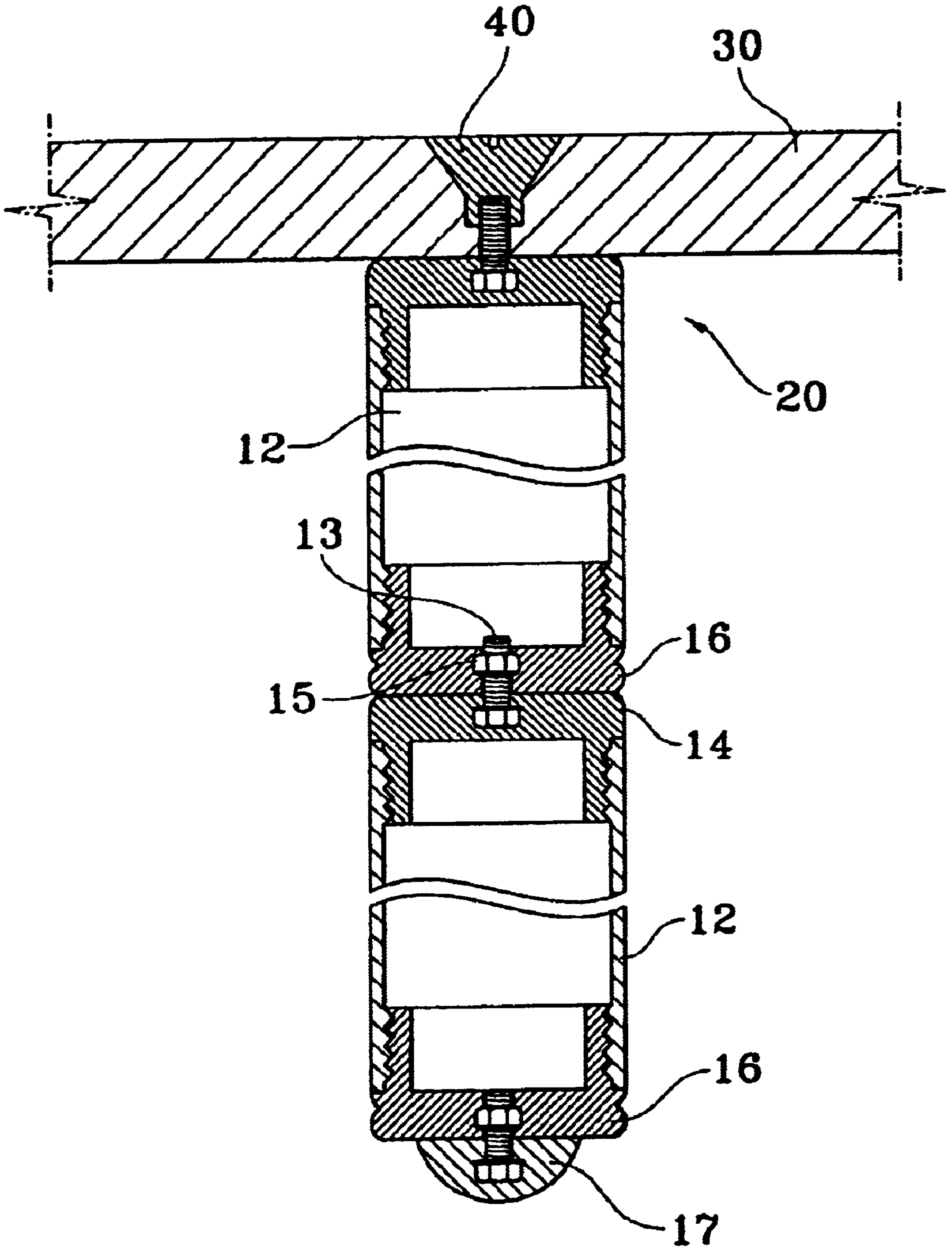
FIG. 6 is a cross-sectional view for illustrating another embodiment of the present invention.
Figure 7:
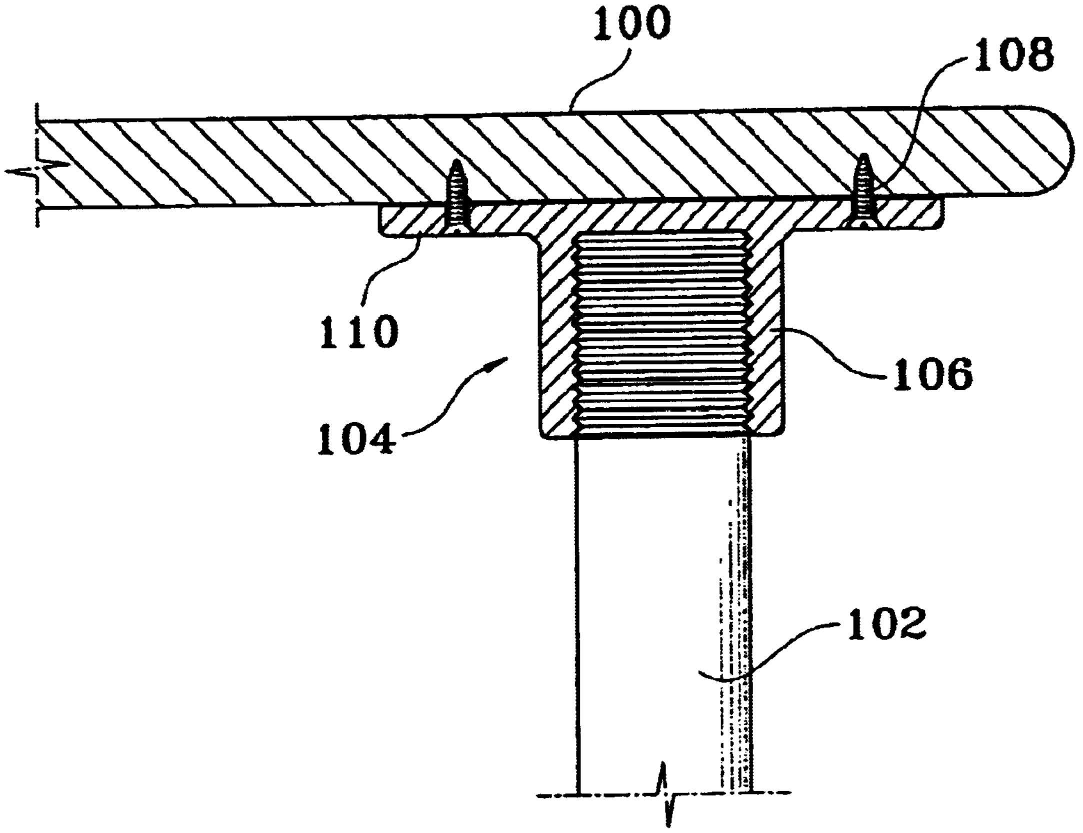
FIG. 7 is a cross-sectional view for illustrating the coupled state of a leg of a conventional desk.

Besides the mechanism that legs are coupled to the upper plate 30, another application is made by using a fixing bolt 40 that can function as a nut part at the upper plate, as shown in FIG. 6, to thereby form the leg structure of a desk the height of which is adjustable by connecting a plurality of leg members 12.

Operational effects of the aforementioned structure of the present invention will be described below.

First of all, the fitting protruder 23 to be inserted into the fitting groove 31 of the upper plate 30 includes teeth 24 with an acute angle shaped at the end thereof to provide a slight degree of elasticity in insertion, thereby achieving the stronger coupling structure between the upper plate 30 and the leg 10.

Secondly, compared to the prior art in which only a plurality of screws have been coupled at the flange part for support of the leg structure of a desk, the fitting protruder 23 protruded at the center of the flange part more firmly support the legs against external force that may be given from the lateral direction of legs, to thereby prevent the possible application of an excessive force to the screws 22 coupling the flange 21. As a result, the leg structure of a desk can have a far stronger coupling state between the screws 22 and the flange 21, minimizing generation of any movement.

Thirdly, as described above, a hard reinforcing member 26 inserted into the groove 25 formed at the flange part 21 can minimize the movement between the screws 22 and the flange part 21.

On the other hand, as described above, a plurality of leg members 12 are rotated for connection or disconnection to adjust the length of legs as frequently as needed. Thus, a plurality of leg members 12 are formed by coupling male and female screw parts 14, 16 at both ends thereof, so that the leg 10 can be adjustable by connection or disconnection of leg members 12 by as big as the length of respective leg members 12.

In other words, the smaller each leg member 12 is, the more delicately adjustable the length of the leg 10 is in the leg structure of a desk.

As described above, there are advantages in the leg structure of a desk in that the coupling force is greatly reinforced between an upper plate and legs of a desk to improve durability without easy breakdown of the leg coupling structure and the height of a desk becomes more easily adjustable.

What is claimed is:

1. A leg structure of a desk comprising:

a leg:

a coupling unit having a bottom side coupled with an upper end of the leg, a flange part formed at an upper side to be coupled to an upper plate with a plurality of screws and a fitting protruder formed at the top center of the flange part;

a fitting groove formed at a bottom surface of the upper plate for insertion of the fitting protruder.

2. The structure, as defined in claim 1, wherein the coupling state between the leg and coupling unit is achieved by coupling a female screw formed open to the bottom of the coupling unit and a male screw formed at the leg.

3. The structure, as defined in claim 1, wherein a plurality of teeth are formed at the external circumferential surface of the fitting protruder.

4. The structure, as defined in claim 1, wherein a predetermined depth of groove is formed at the upper portion of the flange, and a hard type reinforcing matter is inserted into the groove.

5. The structure, as defined in claim 4, wherein a fitting hole for inserting fitting protruder is formed at the center of the reinforcing matter.

6. A leg structure of a desk comprising:

a plurality of leg members;

a male screw part screwed to one end of the leg members with a bolt part externally protruded at the center thereof; and a female screw part screwed to the other end of the leg members with a nut part at the center thereof to be coupled with the bolt part of the male screw part, so that a plurality of leg members with the male and female screw parts coupled at both sides thereof are sequentially connected to form a leg of a desk.

7. The structure, as defined in claim 6, wherein the bolt part of the male screw part is constructed with a bolt inserted into the body of the male screw part made of a synthetic material.

8. The structure, as defined in claim 6, wherein the nut part of the female screw part is constructed with a bolt inserted into the body of the female screw part made of synthetic material.

9. A leg structure of a desk comprising:

a plurality of leg members;

a male screw part screwed to one end of the leg members with a bolt part externally protruded at the center thereof;

a female screw part screwed to the other end of the leg members with a nut part at the center thereof to be coupled with the bolt part of the male screw part, so that a plurality of leg members with the male and female screw parts coupled at both sides thereof are sequentially connected to form a leg of a desk;

a coupling unit having a bottom side coupled with an upper end of the leg, a flange part formed at an upper side to be coupled to an upper plate with a plurality of screws and a fitting protruder formed at the top center of the flange part; and a fitting groove formed at the bottom surface of an upper plate for insertion of the fitting protruder.

* * * * *